(12) United States Patent
Hall et al.

(10) Patent No.: US 12,105,544 B2
(45) Date of Patent: Oct. 1, 2024

(54) NON-VENTED, SEMI-AUTOMATED WATER DRAIN VALVE SYSTEM

(71) Applicant: Cummins Filtration Inc., Nashville, TN (US)

(72) Inventors: Philip S. Hall, Cookeville, TN (US); Peter K. Herman, Stoughton, WI (US); Wassem Abdalla, Fishers, IN (US); Vijay Dinkar Kolhe, Nashik (IN)

(73) Assignee: Cummins Filtration Inc., Nashville, TN (US)

(*) Notice: Subject to any disclaimer, the term of this patent is extended or adjusted under 35 U.S.C. 154(b) by 109 days.

(21) Appl. No.: 17/802,247

(22) PCT Filed: Feb. 16, 2021

(86) PCT No.: PCT/US2021/018197
§ 371 (c)(1),
(2) Date: Aug. 25, 2022

(87) PCT Pub. No.: WO2021/173379
PCT Pub. Date: Sep. 2, 2021

(65) Prior Publication Data
US 2023/0079260 A1    Mar. 16, 2023

Related U.S. Application Data

(60) Provisional application No. 62/982,930, filed on Feb. 28, 2020.

(51) Int. Cl.
*G05D 9/12* (2006.01)
*B01D 17/02* (2006.01)
*B01D 36/00* (2006.01)

(52) U.S. Cl.
CPC .............. *G05D 9/12* (2013.01); *B01D 17/02* (2013.01); *B01D 36/005* (2013.01)

(58) Field of Classification Search
CPC .... B01D 17/12; B01D 36/005; B01D 36/006; F02M 37/28; G05D 9/12; F16K 21/04; F16K 21/16
See application file for complete search history.

(56) References Cited

U.S. PATENT DOCUMENTS 4,193,580 A * 3/1980 Norris .................. F16K 5/06
251/304
6,207,045 B1   3/2001 Jiang
(Continued)

FOREIGN PATENT DOCUMENTS

WO    WO-01/96731 A1    12/2001

OTHER PUBLICATIONS

International Search Report and Written Opinion issued for PCT Application No. PCT/US2021/018197 issued May 4, 2021, 20 pages.

*Primary Examiner* — Hailey K. Do
(74) *Attorney, Agent, or Firm* — Foley & Lardner LLP

(57) ABSTRACT

A water drain valve system structured to drain water from a fuel-water separator. The system includes a collection vessel structured to temporarily store water, a liquid level sensor structured to monitor a level of the temporarily stored water, a drainage port extending radially from the collection vessel and having a port inlet and a port outlet, and a valve assembly. The port inlet receives water to be drained from the collection vessel, the water flowing through the drainage port and exiting through the port outlet. The valve assembly is movable between a closed position in which the port outlet is closed, and an open position, in which the port outlet is open, to selectively allow water to be drained from the collection vessel. The valve assembly includes a solenoid coupled to a seal member, the seal member closing the port outlet in the closed position of the valve assembly.

19 Claims, 17 Drawing Sheets

(56) References Cited

U.S. PATENT DOCUMENTS

| | | | |
|---|---|---|---|
| 6,358,416 B1 | 3/2002 | Miller et al. | |
| 6,974,120 B2 | 12/2005 | Wilson et al. | |
| 9,751,034 B2 | 9/2017 | Zuccone | |
| 9,951,881 B2 * | 4/2018 | Shah | F16K 37/0025 |
| 11,167,229 B2 * | 11/2021 | Mishima | B01D 35/0273 |
| 2006/0144767 A1 | 7/2006 | Roesgen | |
| 2007/0034560 A1 | 2/2007 | Janik et al. | |
| 2008/0110812 A1 | 5/2008 | Jensen et al. | |
| 2009/0173639 A1 | 7/2009 | Ferrari et al. | |
| 2016/0310882 A1 | 10/2016 | Crary et al. | |
| 2019/0170261 A1 * | 6/2019 | Vu | F16K 27/0236 |

* cited by examiner

NON-VENTED, SEMI-AUTOMATED WATER DRAIN VALVE SYSTEM

CROSS-REFERENCE TO RELATED APPLICATIONS

The present application is a national stage of PCT Application No. PCT/US2021/018197, filed Feb. 16, 2021 which claims the benefit of U.S. Provisional Application No. 62/982,930, filed Feb. 28, 2020. The contents of these applications are incorporated herein by reference in their entirety and for all purposes.

TECHNICAL FIELD

The present invention relates generally to the field of fuel filtration systems, and more specifically to the drainage of water separated from the fuel in such systems.

BACKGROUND

Fuel-water separators are used in conjunction with a fuel filter to separate water from fuel so that the accumulated water can be removed from the fuel filter. Removal of the water may be accomplished by a valve-controlled drain. The water which is separated from the fuel and collected in the fuel filter bowl requires periodic draining in order to a prevent loss of filter capacity and costly fuel system damage due to water ingestion. The drain can be a solenoid-controlled drain with a water-in-fuel sensor and controller circuitry for detecting and removing water trapped in the collection bowl of a water-separating fuel filter.

SUMMARY

Various embodiments relate to a water drain valve system structured to drain water from a fuel-water separator. The system includes a collection vessel structured to temporarily store water, a liquid level sensor structured to monitor a level of the temporarily stored water, a drainage port extending radially from the collection vessel, and a valve assembly. The drainage port includes a port inlet and a port outlet. The port inlet receives water to be drained from the collection vessel, where the water flows through the drainage port and exits through the port outlet. The valve assembly is movable between a closed position and an open position and structured to open the port outlet in the open position and close the port outlet in the closed position to selectively allow water to be drained from the collection vessel. The valve assembly includes a solenoid coupled to a seal member, the seal member closing the port outlet in the closed position of the valve assembly.

Other embodiments relate to a water drain valve system. The system includes a collection vessel that defines a vertical housing axis. The collection vessel includes a housing wall. The housing wall defines an inner cavity. The collection vessel is structured to temporarily store a liquid at the inner cavity. The system also includes a drainage port that extends radially outward from the vertical housing axis and through the housing wall. The drainage port is structured to receive the liquid from the collection vessel at a port inlet and drain the liquid at a port outlet. The system also includes a valve assembly. The valve assembly includes a solenoid that is structured to operate the valve assembly between a closed position and an open position. The valve assembly also includes a seal member that is structured to close the port outlet in the closed position such that the liquid is not permitted to flow through the port outlet and open the port outlet in the open position such that the liquid is permitted to drain through the drainage port.

Still other embodiments relate to a water drain valve system for a fuel-water separator. The system includes a collection vessel, a drainage port, and a valve assembly. The collection vessel is structured to receive a liquid from the fuel-water separator and temporarily store the liquid therein. The collection vessel including a housing wall having a main portion and a valve portion that extends from the main portion to a valve portion face. The drainage port is positioned through a housing wall of the collection vessel. The drainage port is structured to drain the liquid from the collection vessel. The drainage port includes a port inlet structured to receive the liquid from the collection vessel and a port outlet structured to drain the liquid from the drainage port. The valve assembly is positioned at least partially within the valve portion. The valve assembly includes a solenoid housing, a solenoid, and a seal member. The solenoid housing is coupled to the valve portion face. The solenoid is positioned at least partially within the solenoid housing and is structured to operate the valve assembly between an open position and a closed position. The seal member is coupled to the solenoid and is structured to close the drainage port when the valve assembly is in the closed position and open the drainage port when the valve assembly is in the open position.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
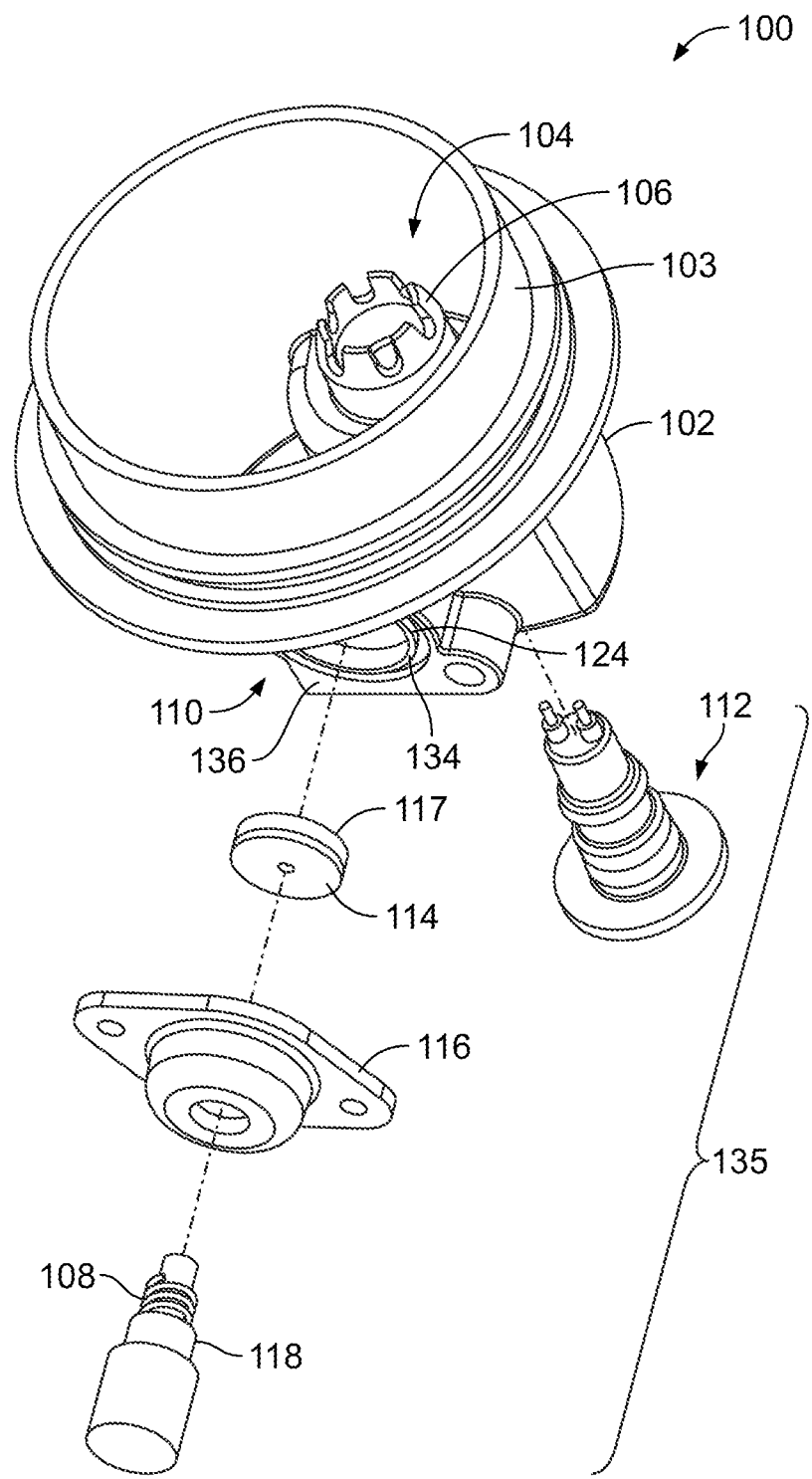
FIG. 1 is an exploded perspective view of a water drain valve system for use with a fuel-water separator, according to an example embodiment.
Figure 2:
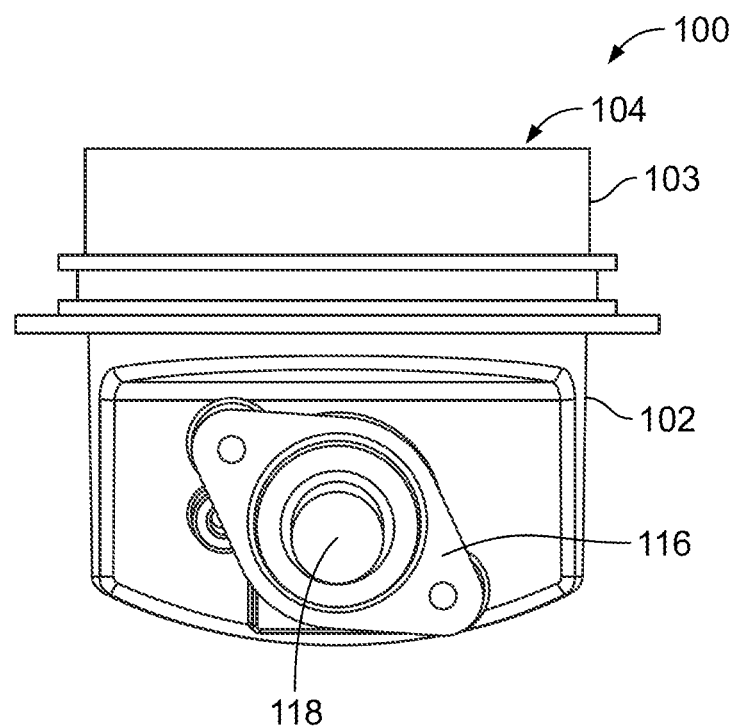
FIG. 2 is a front view of the water drain valve system of FIG. 1.
Figure 3:
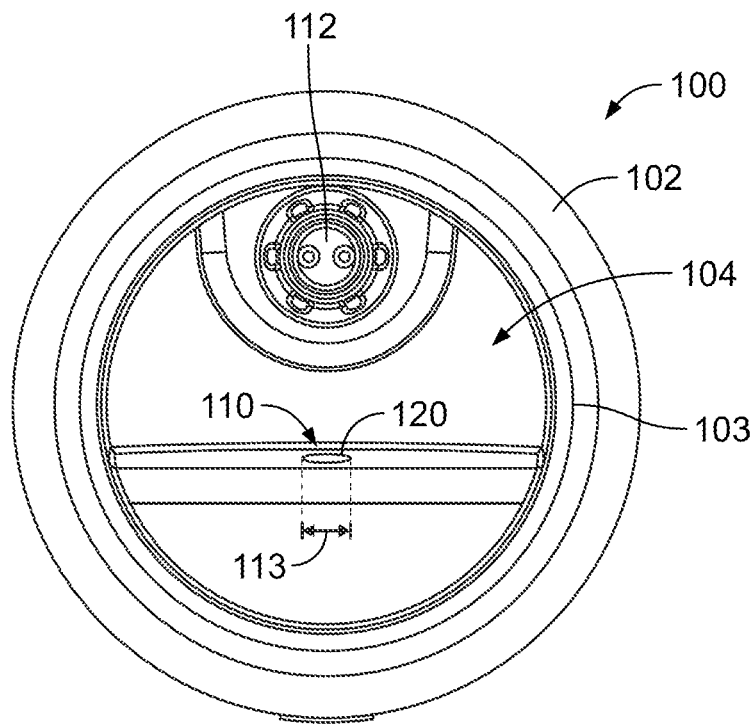
FIG. 3 is a top view of the water drain valve system of FIG. 1.
Figure 4:
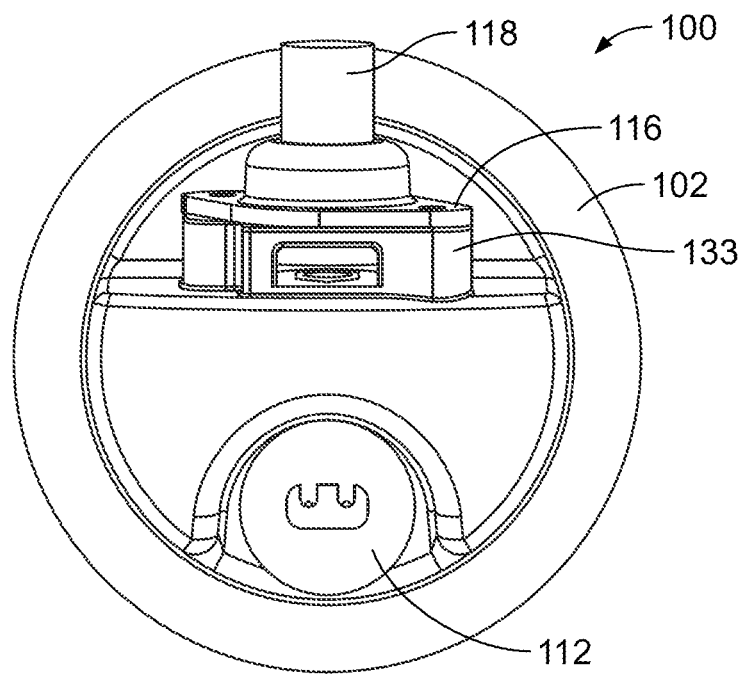
FIG. 4 is a bottom view of the water drain valve system of FIG. 1.

Referring generally to the figures, a non-vented, semi-automated water drain valve system for diesel fuel filtration is described. The semi-automated water drain valve system is used as part of a fuel-water separator system and employs a push/pull electric solenoid valve to open and close the drainage valve port without the need for a dedicated air vent port or passage. The collection vessel of the water drain valve system is coupled to the fuel-water separator by a threaded interface, which can be modified to suit the size of the filter. Other attachment methods are also possible, including a quarter-turn lock or permanent attachment to a fuel filtration housing which employs disposable cartridge filter elements.

Instead of being vertical as is the case in a variety of conventional arrangements, the drainage port extends in a horizontal or substantially horizontal direction, or in a direction with a substantial horizontal component. As used herein, "substantially horizontal" refers to a range from horizontal to up to five degrees below horizontal. In some embodiments, the drainage port is tilted at a downward angle (e.g., up to approximately 60 to 70 degrees from a horizontal direction). Conventional vertical drainage ports require a vent to atmosphere to initiate the draining process because the water (due to high surface tension of about 70 dyne/centimeter (cm)) will hang in a small (e.g., less than approximately 10 millimeters (mm)) diameter vertical port, thereby preventing the drainage of the water from the port. This separate air vent requirement can complicate the tooling design for the collection vessel and seal geometry because the vent must be separately sealed and also preferably opened after the drainage port is opened.

As described further below, the semi-automated water drain valve system described herein includes a near-horizontal drainage port which causes an imbalance between gravity and surface tension, allowing water to freely drain through a circular port even as small as 7 to 10 mm in diameter. As described above, in some embodiments, the drainage port can be tilted up to 60 to 70 degrees from a horizontal direction (e.g., in a direction having at least a horizontal component). Air enters through the top-most portion of the same drainage port and move in a counter-flow direction to the water. The drainage port can be, for example, oblong or obround in cross-sectional shape. By using this shape, fine tuning of the water flow for different applications can be accomplished by manipulating the width of the port while maintaining a minimum height requirement to facilitate non-vented draining. The drainage port can also be a variety of other shapes as described further herein. The single drainage port is sealed using a rubber or elastomeric seal member, which is directly attached or coupled to the piston end of the solenoid. The seal member covers the shape of the drainage port, which may include a small raised rib to further improve sealing contact pressure and seal effectiveness. In some embodiments, an air vent is formed in the top of the valve body downstream of the collection vessel and the drainage port to allow for the optional use of a spout-passage for drained water.

Referring to FIGS. 1-8, various views of a water drain valve system 100 for use with a fuel-water separator are shown, according to an example embodiment. The water drain valve system 100 includes a collection vessel 102 having an interior cavity 104 defined by a housing 103, a water-in-fuel (WIF) sensor 112 positioned and sealed within a sensor compartment 106 within the interior cavity 104, and a valve assembly 135 structured to selectively permit the drainage of liquid from the collection vessel 102 via a single drainage port 110. The collection vessel 102 temporarily collects water (or other liquid) that is separated from a fuel-water separator. The water drain valve system 100 is structured to facilitate the drainage of the collected water from the collection vessel 102. Accordingly, the valve assembly 135 is positioned near a base of the collection vessel 102. The valve assembly 135 includes a solenoid housing 116, a solenoid 118 (e.g., a push/pull electric solenoid) positioned at least partially within the solenoid housing 116, a spring 108 biasing the valve assembly 135 to a closed position, and a seal member 114. The valve assembly 135 is coupled to the housing 103 via the solenoid housing 116 (e.g., a mounting bracket).

The WIF sensor 112 monitors the liquid level within the interior cavity 104 of the collection vessel 102. The WIF sensor 112 activates the valve assembly 135 (e.g., solenoid 118) to drain liquid from the collection vessel 102 when the liquid reaches a certain level. For example, the sensor may be communicatively coupled to the solenoid 118 and selectively control the actuation of the solenoid 118 based on the liquid level within the interior cavity 104. Many different types of WIF sensors and/or liquid level sensors may be used with the water drain valve system 100 to monitor the liquid level within the collection vessel 102 and actuate the valve assembly 135.

Figure 5:
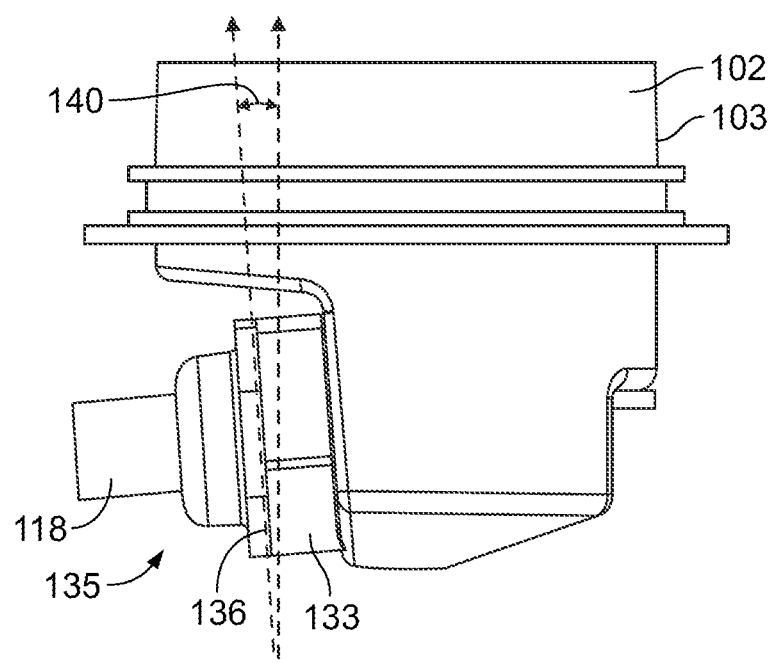
FIG. 5 is a side view of the water drain valve system of FIG. 1.

Referring to FIG. 5, the housing 103 includes a valve portion 133 extending from the main portion of the housing 103 to a valve portion face 136. The valve portion 133 houses at least a portion of the valve assembly 135. The solenoid housing 116 couples to the valve portion face 136 to couple the valve assembly 135 to the housing 103 of the collection vessel 102. The valve portion face 136 is positioned an angle 140 from vertical (e.g., from vertical housing axis 115 shown in FIG. 7). In various embodiments, the valve portion face 136 can be positioned at any angle from vertical (e.g., up to 60 degrees from vertical, up to 70 degrees from vertical). In some embodiments, the valve portion face 136 is positioned up to 30 degrees from vertical.

Figure 7:
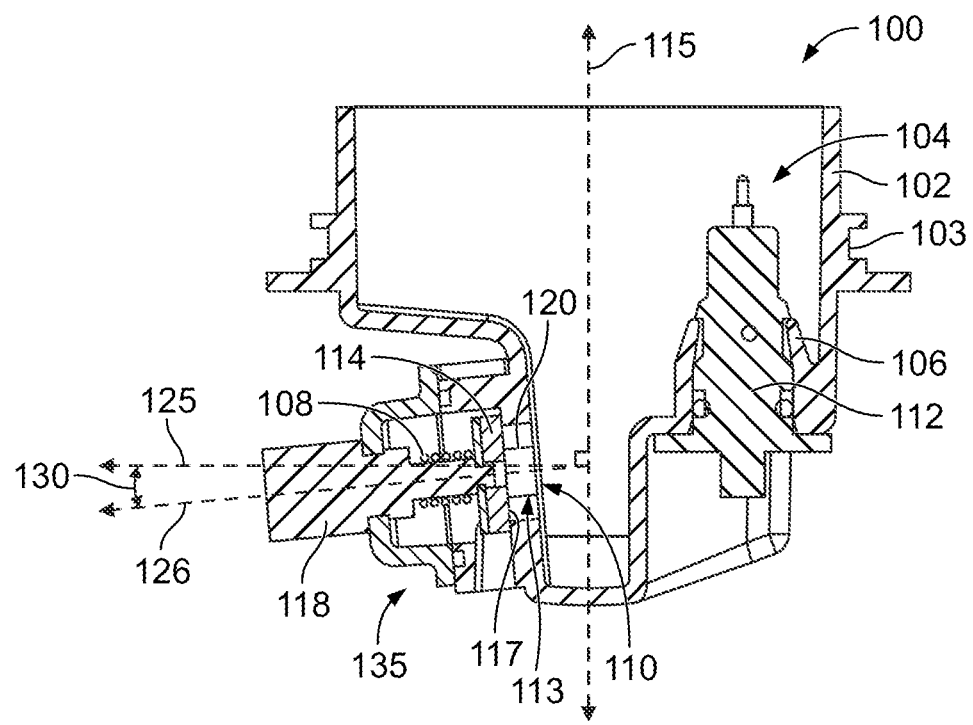
FIG. 7 is a side section view of the water drain valve system of FIG. 1 in a closed position.
Figure 8:
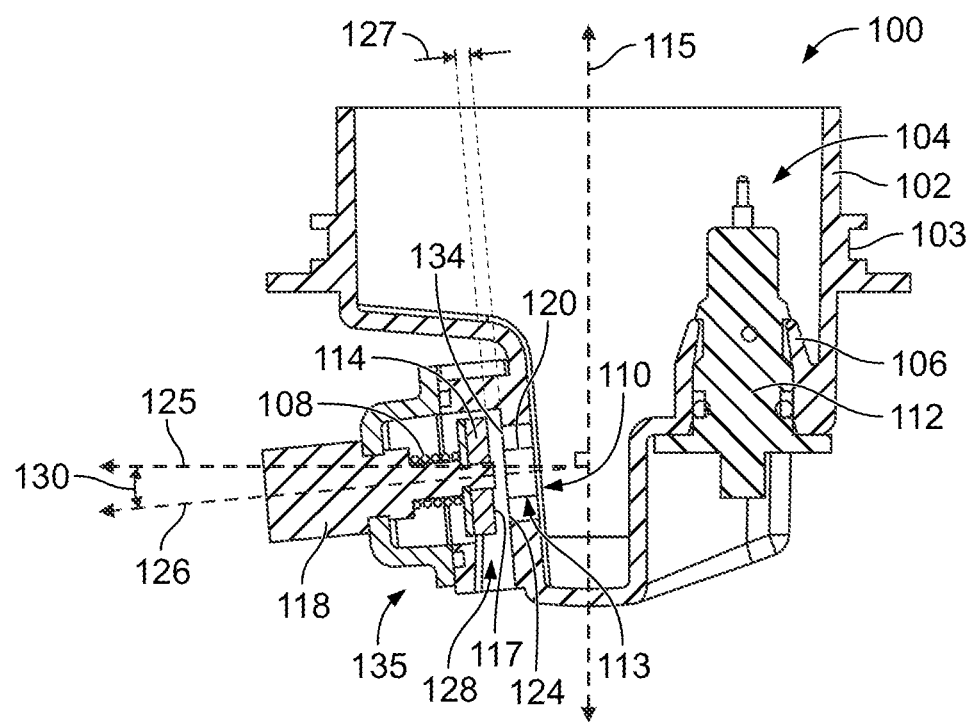
FIG. 8 is a side section view of the water drain valve system of FIG. 1 in an open position.
Figure 9:
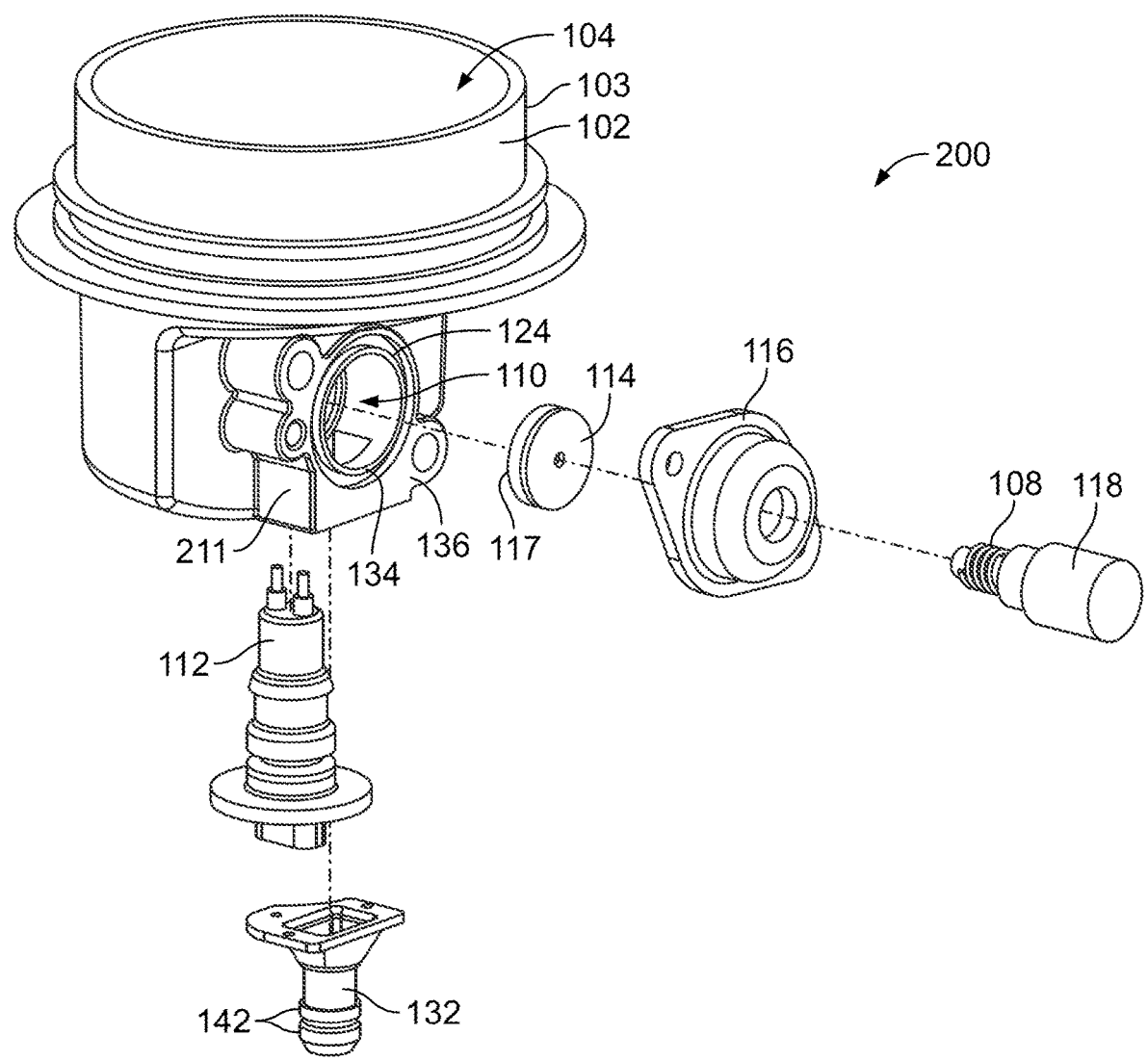
FIG. 9 is an exploded perspective view of a water drain valve system for use with a fuel-water separator, according to an example embodiment.
Figure 10:
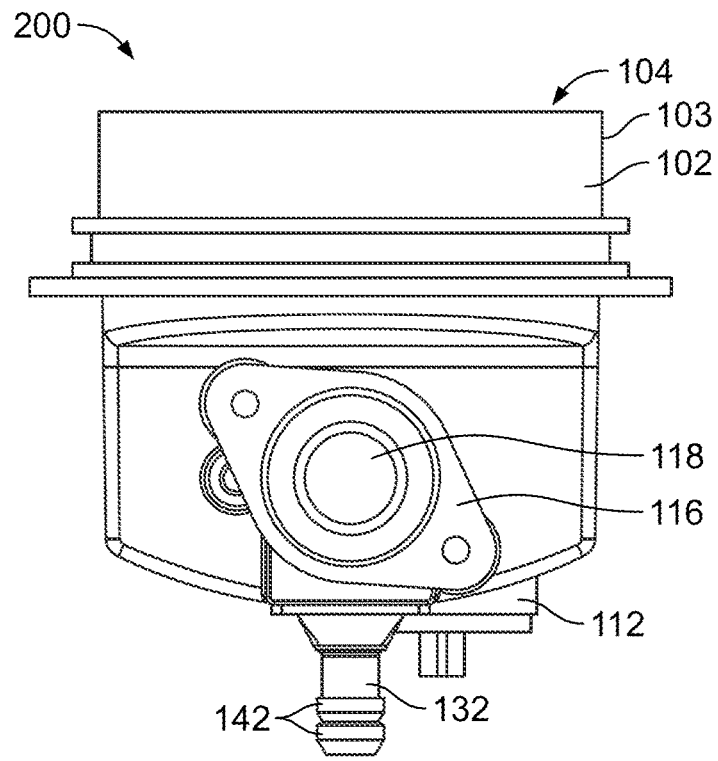
FIG. 10 is a front view of the water drain valve system of FIG. 9.
Figure 11:
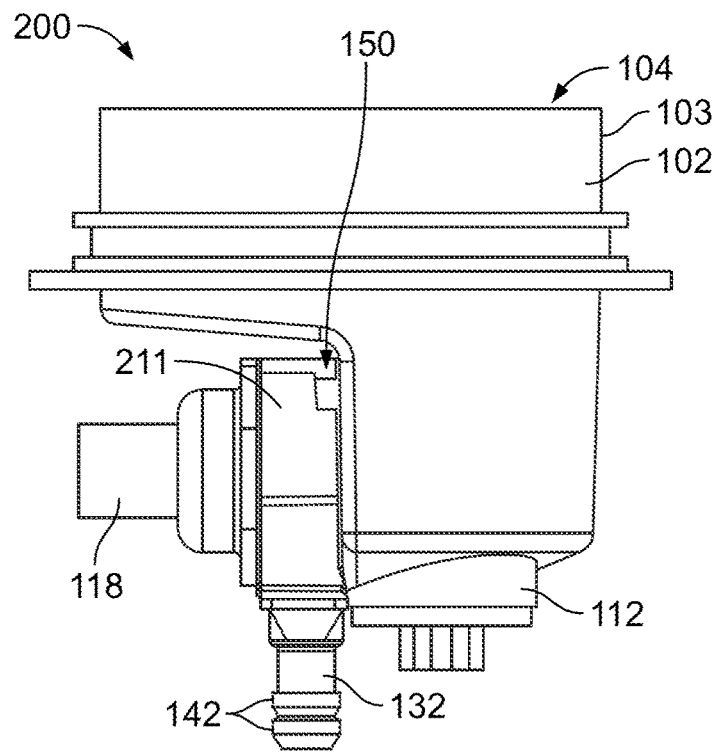
FIG. 11 is a side view of the water drain valve system of FIG. 9.
Figure 12:
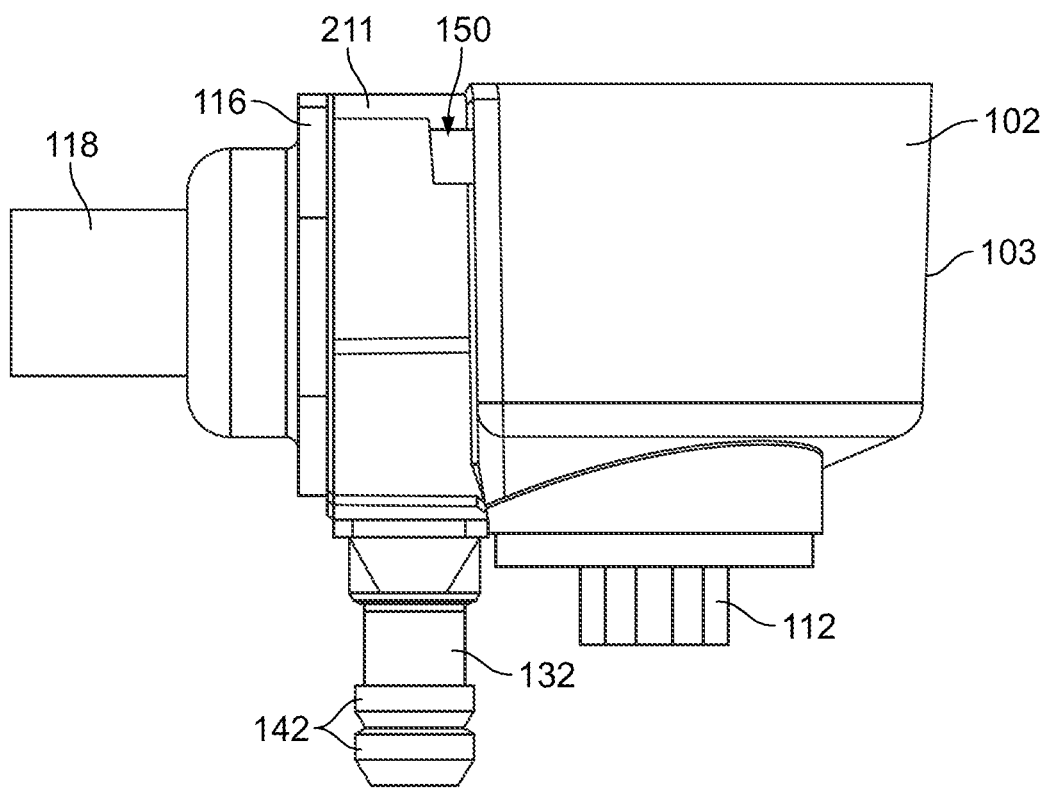
FIG. 12 is a side view of a portion of the water drain valve system of FIG. 9.

Referring to FIGS. 7-8, the drainage port 110 extends through the housing 103 in a radial or horizontal direction (e.g., radially outward from vertical housing axis 115). In some embodiments, the drainage port 110 is substantially horizontal. The drainage port 110 allows liquid to flow out of the collection vessel 102 when the valve assembly 135 is in an open position. The drainage port 110 includes a port inlet 120 and a port outlet 122. Liquid exiting the collection vessel 102 via the drainage port 110 flows from the interior cavity 104 of the collection vessel 102, through the port inlet 120, and exits the drainage port 110 through the port outlet 122.

In some embodiments, the drainage port 110 is cylindrical in shape and includes a diameter 113 large enough to accommodate simultaneous counter-flow of air and liquid therethrough. In some embodiments, the diameter 113 ranges from 6 mm to 15 mm. In other embodiments, the diameter 113 can be larger than 15 mm or smaller than 6 mm. In some embodiments, the drainage port 110 is non-cylindrical in shape. As shown in FIGS. 7 and 8, the drainage port 110 defines a drainage port axis 126. The drainage port axis 126 extends downward from horizontal 125 (e.g., horizontal axis perpendicular to vertical housing axis 115) by an angle 130. The angle 130 can range from 0 degrees to 70 degrees from horizontal 125, more particularly from 0 degrees to 60 degrees from horizontal 125, and even more particularly from 0 degrees to 30 degrees from horizontal 125. In some embodiments, the drainage port axis 126 is substantially horizontal.

Figure 6:
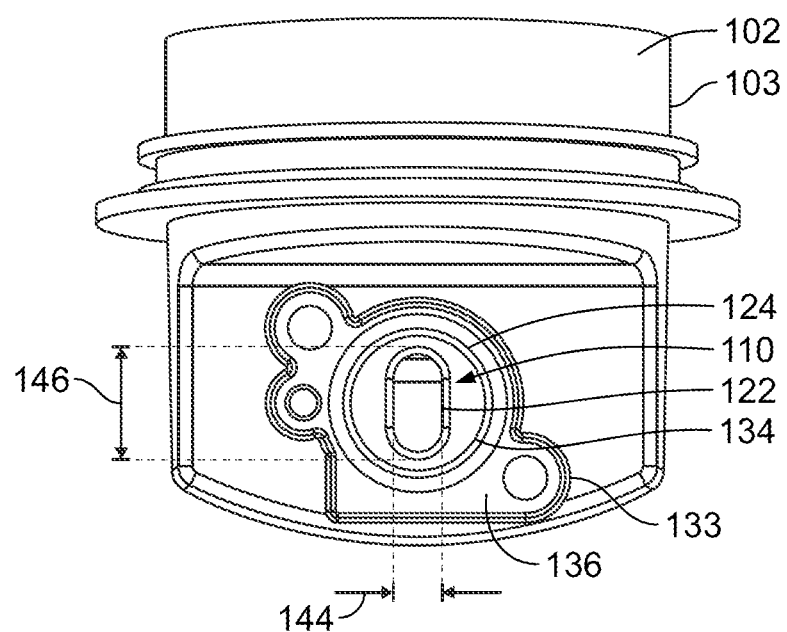
FIG. 6 is a front view of a portion of the water drain valve system of FIG. 1.

The seal member 114 of the valve assembly 135 includes a seal member surface 117 and is coupled to a piston end of the solenoid 118. The seal member surface 117 of the seal member 114 interacts with the port outlet 122 to open and close the port outlet 122. The seal member surface 117 may be rubber or elastomeric. The water drain valve system 100 also includes a rib 124 (e.g., a raised continuous protrusion extending from the valve portion face 136) having a rib surface 134 which seals against the seal member surface 117 in a closed position of the valve assembly 135. The rib 124 extends around the perimeter of the port outlet 122. As shown in FIG. 6, the rib 124 is circular in shape. In other embodiments, the rib 124 is otherwise shaped. By using the rib 124, the seal compression pressure between the valve assembly 135 and the housing 103 of the collection vessel 102 and the sealing reliability of the elastomeric seal member surface 117 may be improved. In some embodiments where the port outlet 122 is not circular in shape, the rib 124 includes a shape tracing the perimeter of the port outlet 122. Thus, in some embodiments, the rib 124 is elongated in shape, obround, asymmetric, etc. In some embodiments where the port outlet 122 is not circular in shape, the rib 124 is still circular in shape. This may provide a uniform seal compression force on the rib 124, thereby improving the seal between the valve assembly 135 and the collection vessel 102.

In FIG. 7, the valve assembly 135 is shown in a closed position. In FIG. 8, the valve assembly 135 is shown in an open position. In the open position, a gap 128 exists between the seal member surface 117 and the rib surface 134. The gap 128 includes a valve displacement 127 defined by the distance between the rib surface 134 and the seal member surface 117 in the open position of the valve assembly 135. In some embodiments, the valve displacement 127 can range from 0.75 mm to 5 mm. In some embodiments, the valve displacement 127 can range from 1 to 2.5 mm. In some embodiments, the valve displacement 127 can range from 1 to 2 mm. In some embodiments, the valve displacement 127 can range from 1 mm to 1.5 mm.

As noted above, the drainage port 110 (and thus, the port inlet 120 and port outlet 122) may be a variety of shapes. Referring to FIG. 6, the port outlet 122 includes a width 144 and a height 146. In some embodiments, the width 144 and height 146 are not equal and the drainage port 110 is a non-cylindrical port. In some embodiments, the width 144 can range from 2 to 6 mm and the height 146 can range from 7 to 15 mm. In some embodiments, the width 144 is greater than approximately 2 mm. Using a width 144 greater than 2 mm may improve the draining of liquid through the drainage port 110. Below 2 mm, the surface tension forces may greatly impede any draining. In some embodiments, the height 146 is greater than approximately 7 mm. Using a height 146 greater than 7 mm may improve the draining of liquid through the drainage port 110. Below 7 mm, the surface tension forces may greatly impede any draining. In some embodiments, a preferable height-to-width ratio is greater than 1. In some embodiments, a preferable height-to-width ratio ranges from 1.5 to 10. In other embodiments, the width 144 and height 146 are equal and the drainage port 110 is cylindrical in shape.

Figure 18:
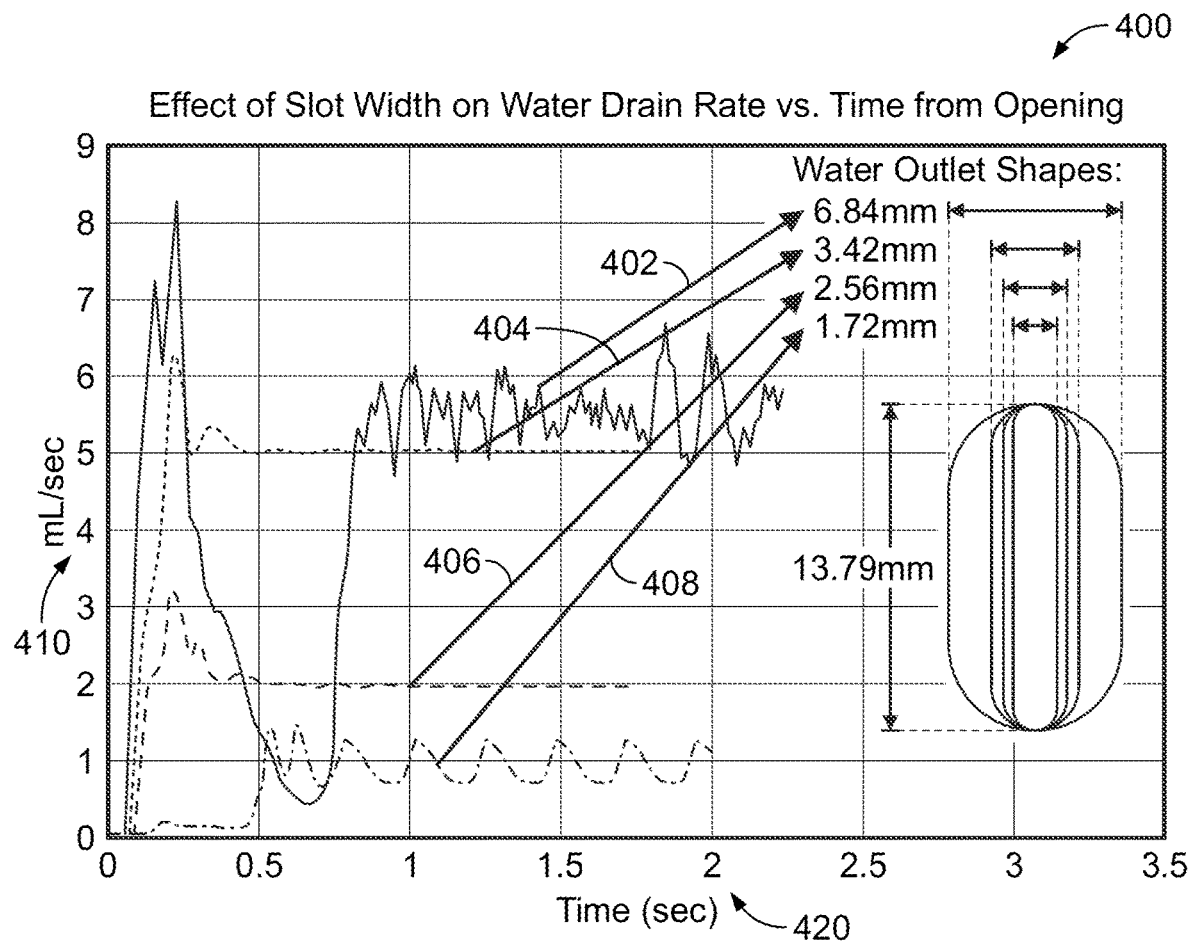
FIG. 18 is a graph of the effect of slot width on a water drain rate over time, according to an example embodiment.
Figure 19:
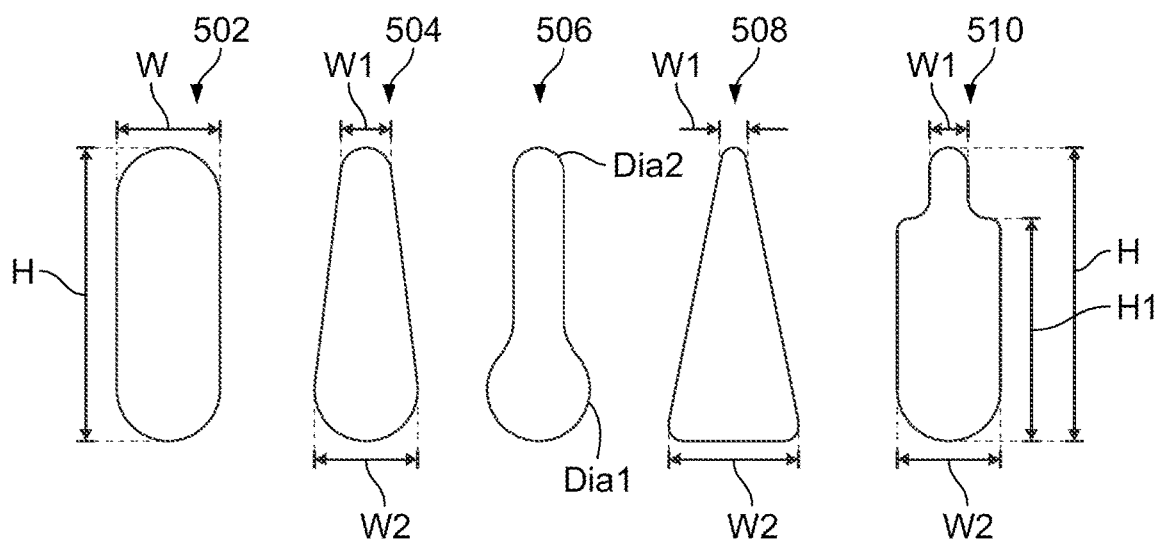
FIG. 19 is a front view of various drainage port shapes according to various example embodiments.

FIG. 19 shows representations of a variety of other shapes for, the drainage port 110 can be a variety of other shapes. For example, the port outlet 122 can include an obround shape 502, a tapered obround shape 504 or teardrop, a circular bottom and top obround shape 506, a triangular shape 508, or combination of two obrounds of varying width 510. In some embodiments, using a shape for the port outlet 122 that diminishes toward the top of the port, such as a tapered obround or triangular, further encourage water drainage from the wider bottom section and isolate the incoming airflow within the smaller top inlet section. Further results are discussed herein with regard to FIGS. 17-24 below.

Turning now to FIGS. 9-16, various views of a water drain valve system for use with a fuel-water separator are shown, according to another example embodiment. The water drain valve system 200 is similar to that of water drain valve system 100 of FIGS. 1-8. However, the water drain valve system 200 also includes an air vent 150 formed downstream the collection vessel 102 and drainage port 110 (e.g., downstream the port outlet 122). The air vent 150 is formed in a valve portion 211 of the water drain valve system 200 and is always open (e.g., not sealed). The air vent 150 does not pass into the sealed collection vessel 102. The air vent 150 allows for the use of a spout passage 132. The spout passage 132 includes one or more barbs 142.

Figure 13:
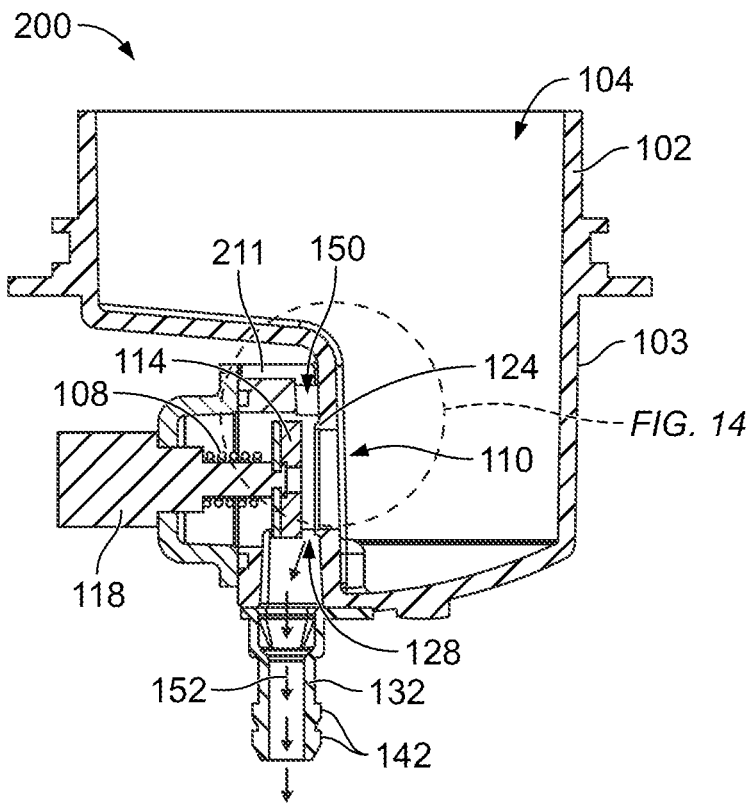
FIG. 13 is a side section view of the water drain valve system of FIG. 9.
Figure 14:
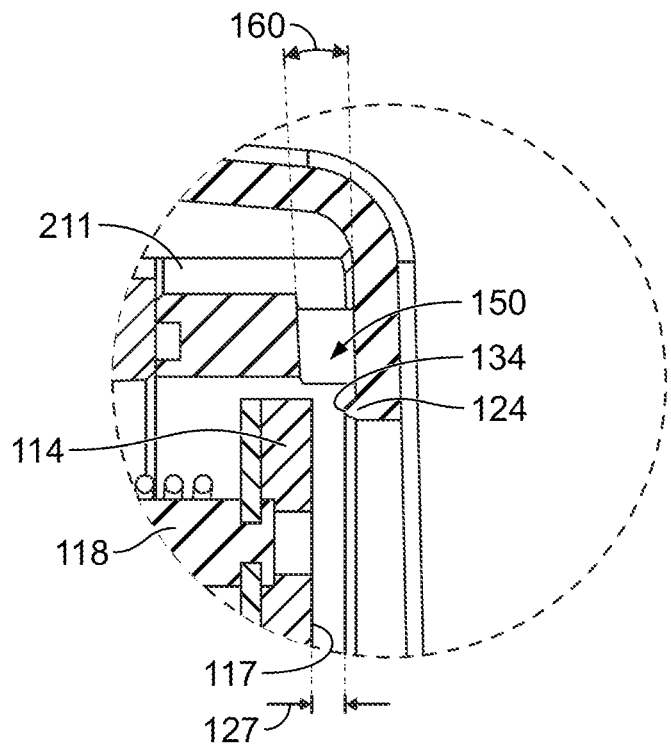
FIG. 14 is a detailed section view of detail A of the water drain valve system of FIG. 13.
Figure 15:
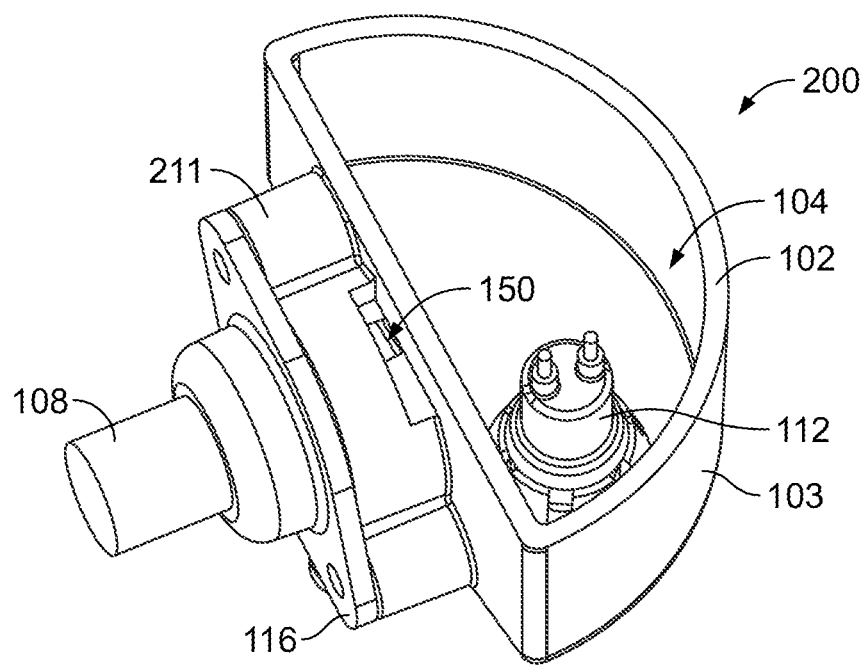
FIG. 15 is a top perspective view of the water drain valve system of FIG. 9.
Figure 16:
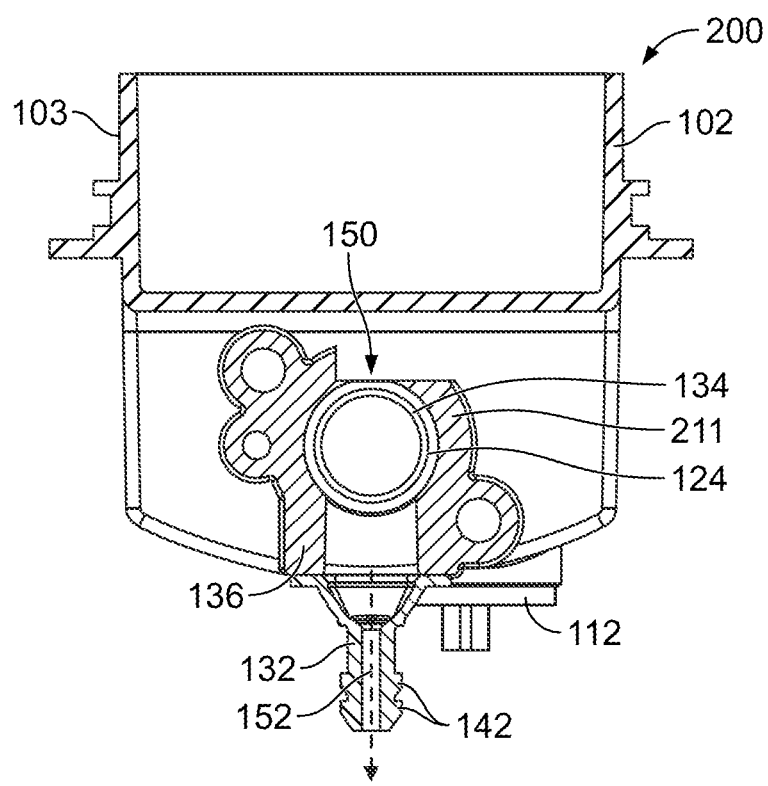
FIG. 16 is a front view of the water drain valve system of FIG. 9.
Figure 17:
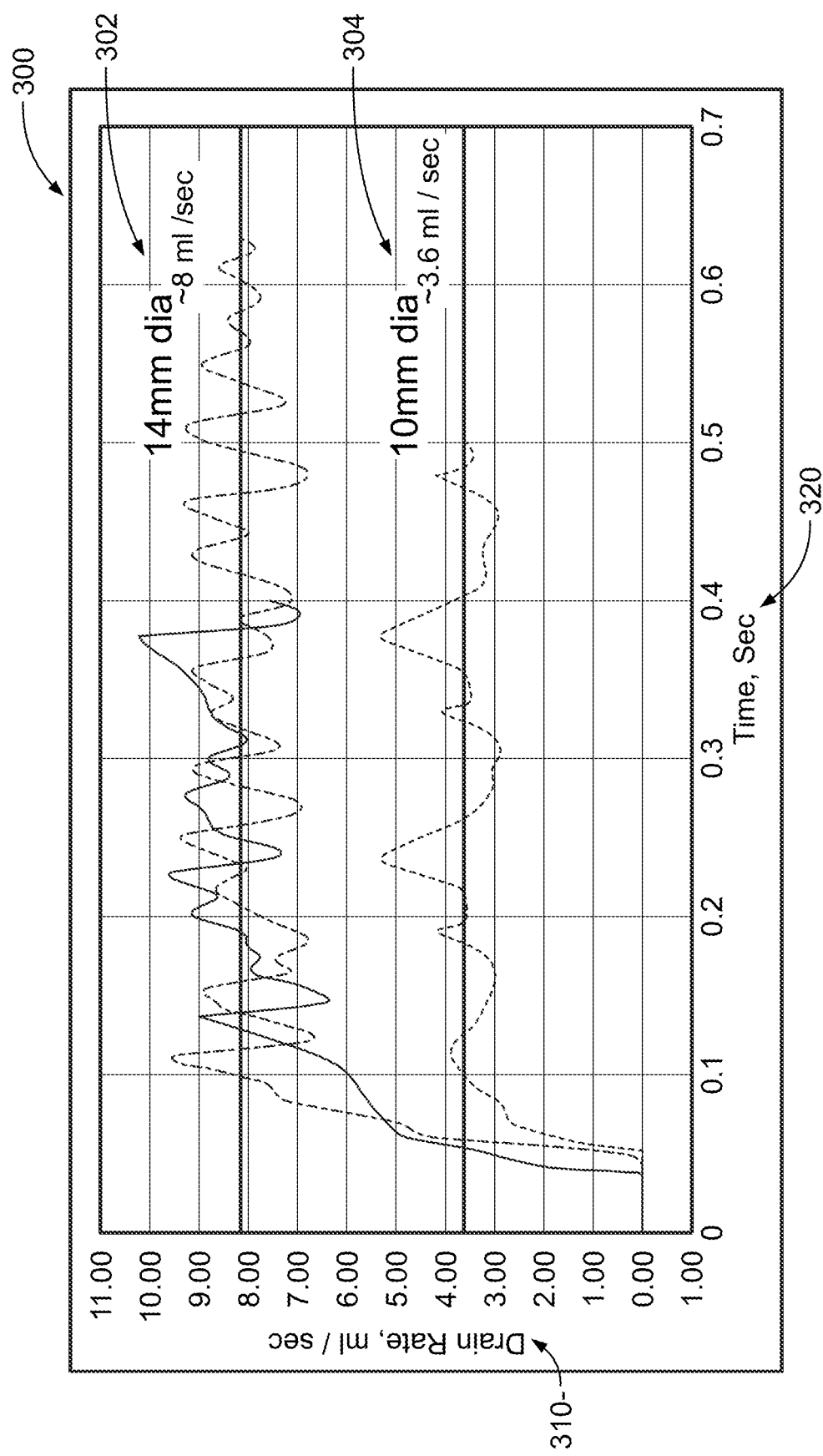
FIG. 17 is a graph of drain rate over time for two drainage ports of different diameters, according to an example embodiment.

Referring to FIGS. 13-14, the air vent 150 is formed in a top portion of the valve portion 211 (e.g., substantially opposite from the spout passage 132). When the valve assembly 135 is in an open position, a gap 128 is formed between the seal member surface 117 and the rib surface 134. The presence of the air vent 150 allows liquid (shown by arrows 152 in FIG. 13) to flow out of the drainage port 110, into gap 128, and through the spout passage 132. In some embodiments, the air vent 150 is formed by a tooling slide action, as shown in FIGS. 15 and 16.

Changing the dimensions of the drainage port 110 can affect the flow rate of fluid therethrough. Accordingly, by changing the dimensions of the drainage port 110, a desired flow rate can be achieved. For example, referring to FIG. 17, the effect of different diameters of circular drainage ports is shown in graph 300. The graph 300 illustrates the drain rate 310 (in milliliters per second (mL/sec)) plotted against the time 320 the drainage port is open (in seconds). In this example, the valve displacement (shown as gap 128 in FIG. 8) is approximately 1 mm. As shown, plot 302 shows that a 14 mm diameter circular drainage port has a drain rate of approximately 8 ml/sec and plot 304 shows that a 10 mm diameter circular drainage port has a drain rate of approximately 3.6 ml/sec. Therefore, the bigger diameter of drainage port, the higher the drain rate.

Referring now to FIG. 18, the effect of different widths of the drainage port 110 (e.g., port outlet 122) is illustrated in graph 400, according to an example embodiment. The graph 400 illustrates the drain rate 410 (in mL/sec) plotted against the time 420 the drainage port is open (in seconds) for different widths 144 of drainage ports 110. For example, plot 402 illustrates the drain rate of a drainage port 110 having a width 144 of approximately 6.8 mm. Plot 404 illustrates the drain rate of a drainage port 110 with a width 144 of approximately 3.4 mm. Plot 406 illustrates the drain rate of a drainage port 110 with a width 144 of approximately 1.7 mm. As shown by the graph 400, as the width 144 increases, the drain rate 410 also increases.

Figure 20:
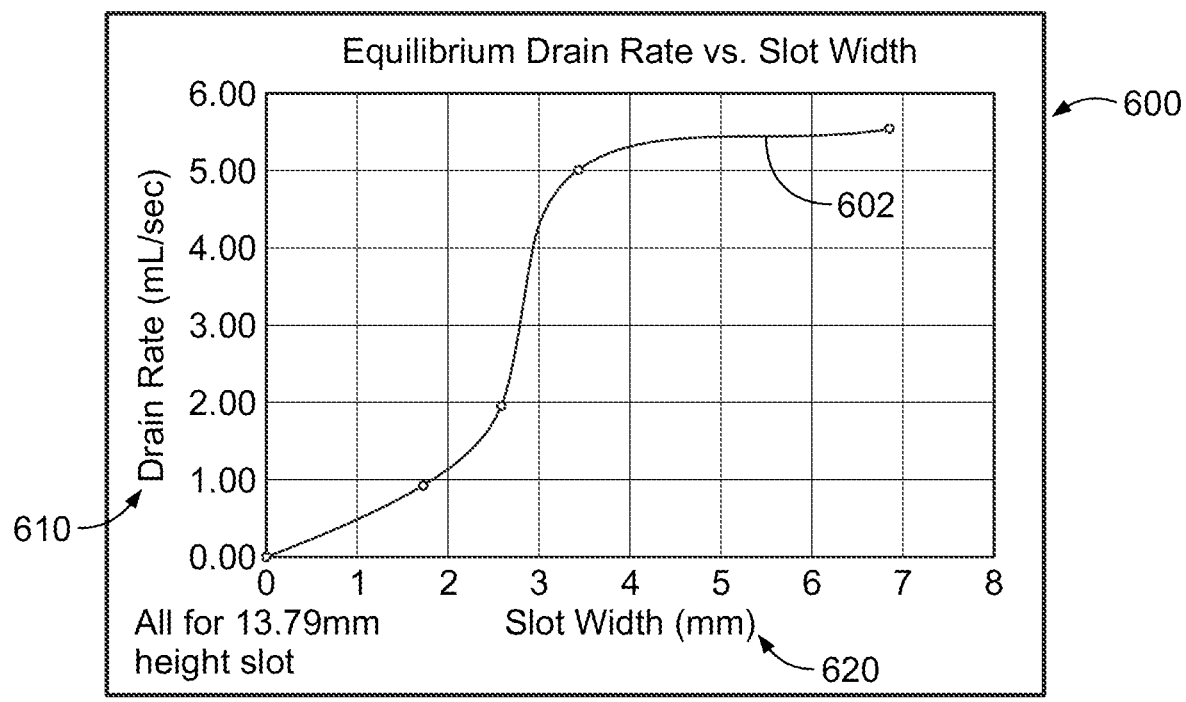
FIG. 20 is a graph of equilibrium drain rate over various slot widths.

Referring now to FIG. 20, an equilibrium drain rate 610 is plotted against a drainage port width 620 in graph 600 for an obround shaped drainage port, according to an example embodiment. Graph 600 includes a curve 602 that illustrates that the steadiness/stability of draining can improve for narrower obround shapes with a height-to-width ratio ranging from 2.3 to 3.4.

Figure 21:
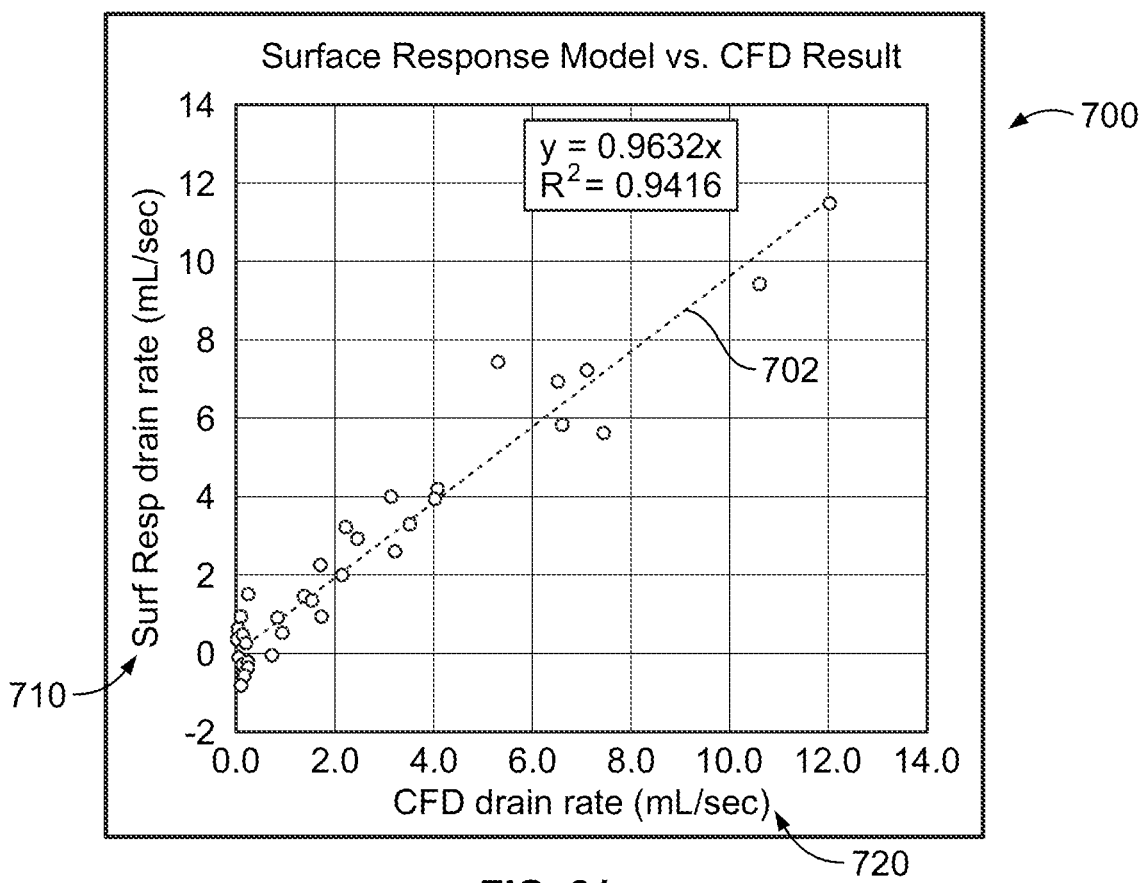
FIG. 21 is a graph of a surface response model against a computational fluid dynamic model result, according to an example embodiment.

Referring now to FIG. 21, a surface response drain rate 710 is plotted against a CFD drain rate 720 in graph 700, according to an example embodiment. The plot 702 illustrates that the output of the surface response model predicts the CFD drain rate model results well and as such, the drain port designs can be easily tuned for drain rate targets, without repeating design/test iterations.

Figure 22A:
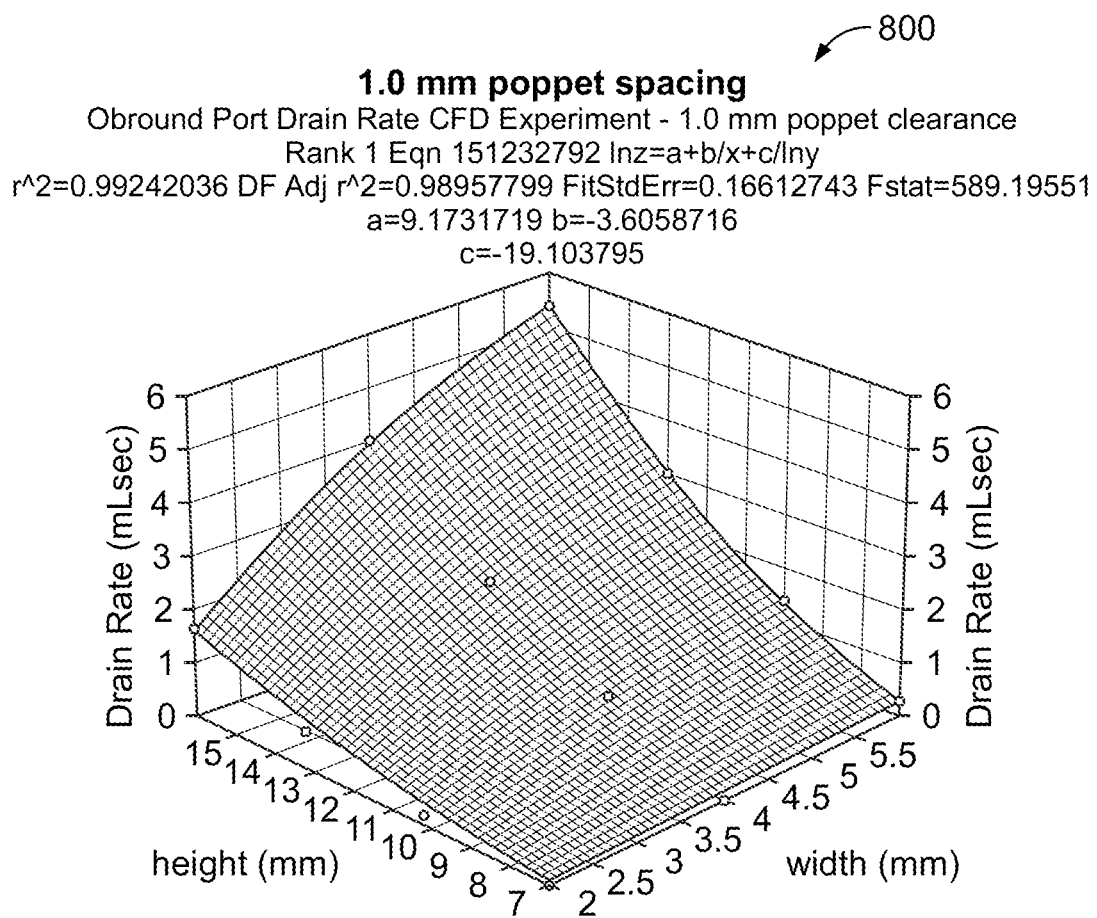
FIGS. 22A-22C illustrate graphs of different poppet spacing and the effect on drain rate.
Figure 22B:
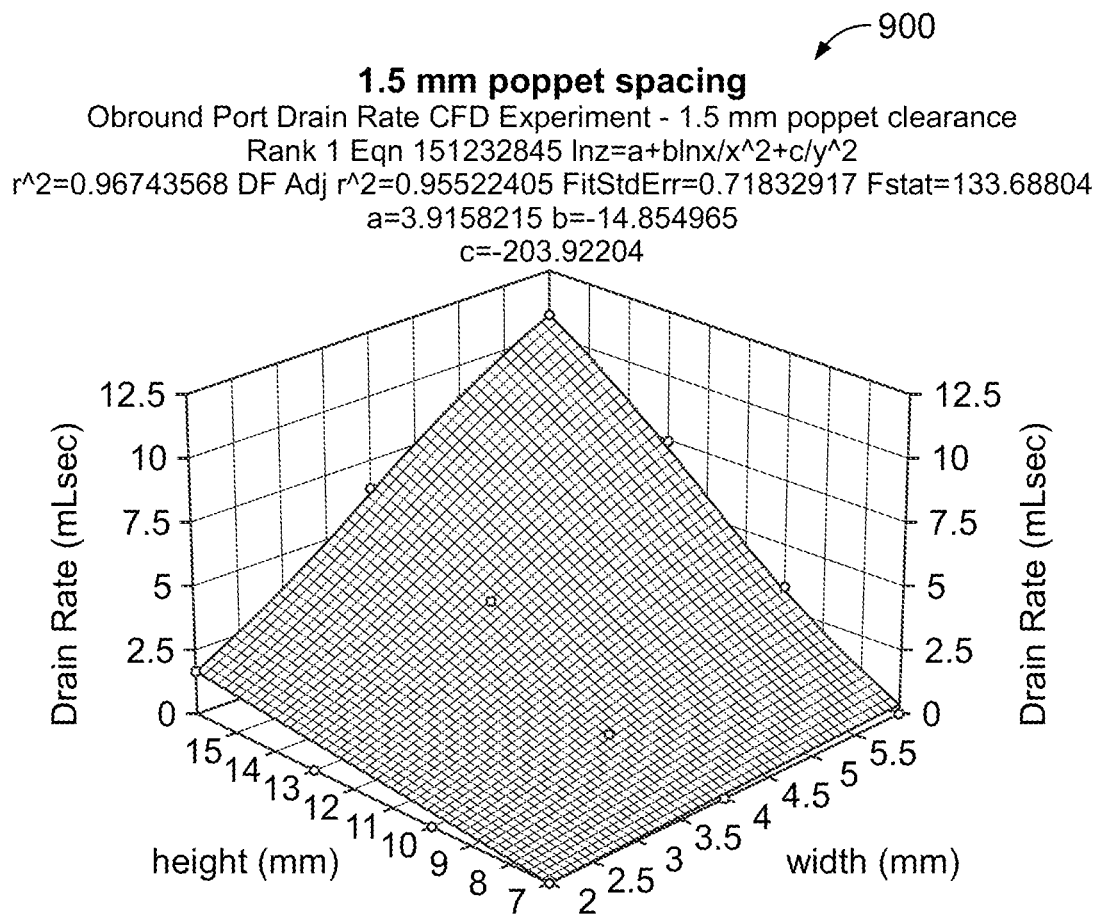
Figure 22C:
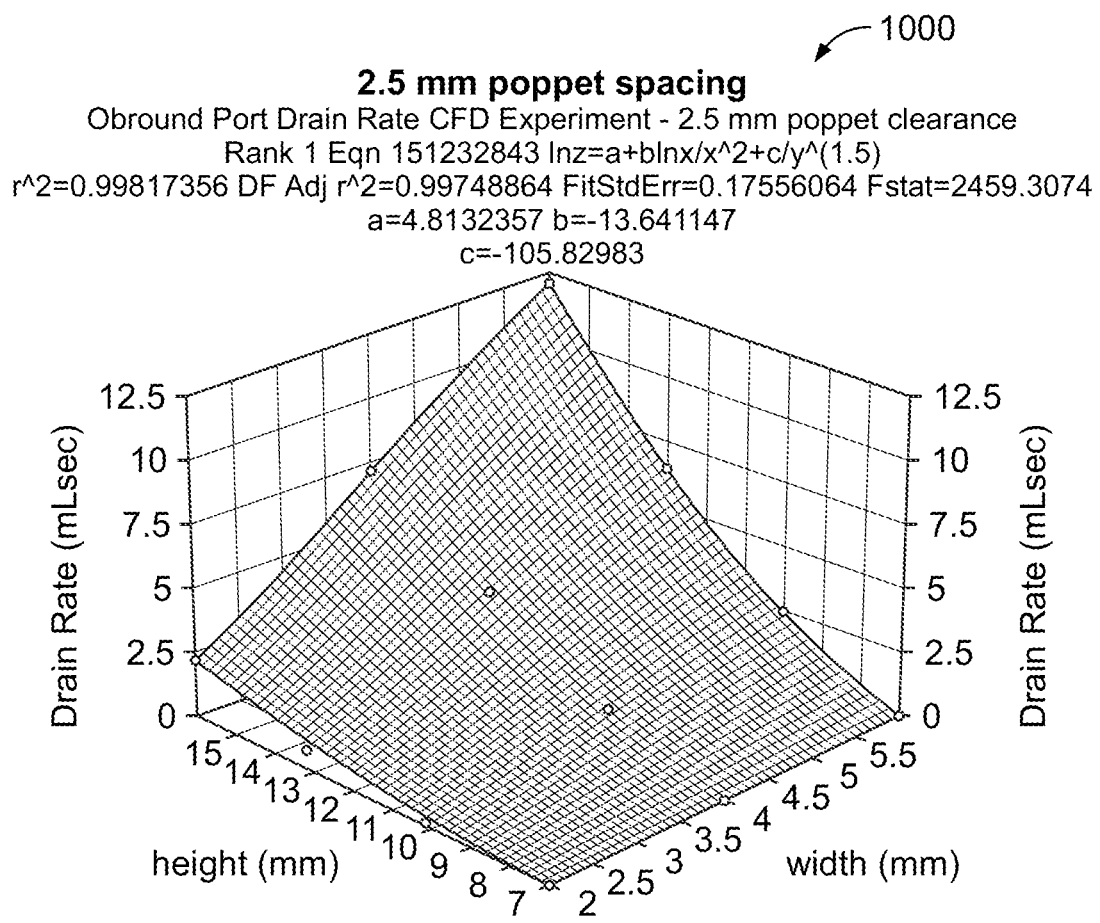

Referring now to FIG. 22, three separate graphs showing surface response plots from analysis of obround vertical slot drain rate as a function of drainage port height 146, drainage port width 144, and valve displacement 127 are shown, according to an example embodiment. Graph 800 illustrates drain rate for a 1.0 mm valve displacement, graph 900 illustrates drain rate for a 1.5 mm valve displacement, and graph 1000 illustrates drain rate for a 2.5 mm valve displacement. The graphs illustrate that drain rate is strongly dependent on width 144 and height 146, but less dependent on valve displacement 127 (e.g., for valve displacement 127 greater than 1 mm). The graphs also illustrate that the height 146 must be greater than 7 mm and the width must be greater than 2 mm to achieve finite drain rate.

Figure 23:
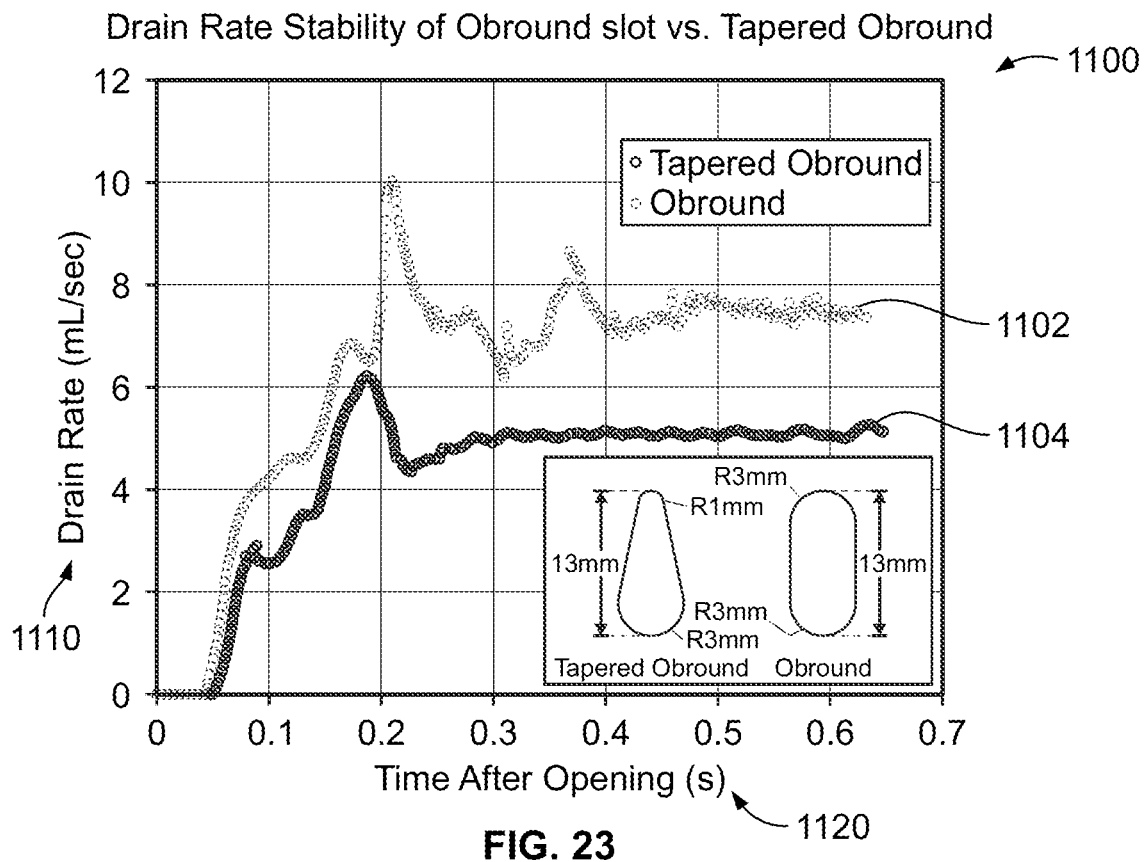
FIG. 23 is a graph of drain rate stability of an obround slot relative to a tapered obround slot, according to an example embodiment.

Referring now to FIG. 23, a graph 1100 illustrating drain rate stability 1102 of an obround drainage port against the drain rate stability 1104 of a tapered obround drainage port is shown, according to an example embodiment. The graph 1100 plots drain rate 1110 over time 1120. The graph 1100 illustrates that the drain rate of the tapered obround shape may be more stable than that of an obround shape.

Figure 24:
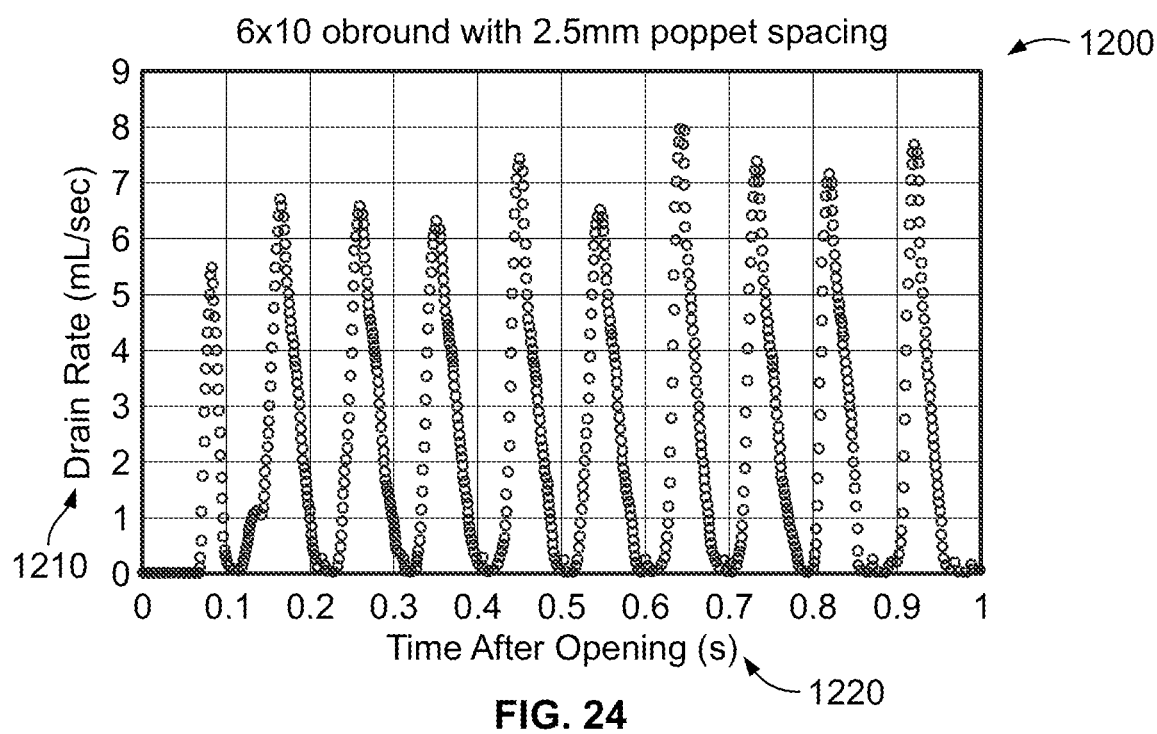
FIG. 24 is a graph of drain rate over time for an obround slot having a specified poppet spacing, according to an example embodiment.

Referring to FIG. 24, a graph 1200 illustrating the drain rate 1210 over time 1220 for a 6 mm by 10 mm obround drainage port with a valve displacement of 2.5 mm is shown, according to an example embodiment. This graph illustrates a high oscillatory, "glugging" flow.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or the like.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A water drain valve system structured to drain water from a fuel- water separator, the system comprising:

a collection vessel structured to temporarily store water;

a liquid level sensor structured to monitor a level of the temporarily stored water;

a drainage port extending radially from the collection vessel along a drainage port axis and having a port inlet and a port outlet, the drainage port axis extending from the port inlet to the port outlet, the port inlet receiving water to be drained from the collection vessel, the water flowing through the drainage port and exiting through the port outlet, the port outlet having a first port side having a first port width and a second port side spaced from the first port side by a port height, the second port side having a second port width greater than the first port width; and a valve assembly movable between a closed position and an open position and structured to open the port outlet in the open position and close the port outlet in the closed position to selectively allow water to be drained from the collection vessel, the valve assembly comprising a solenoid coupled to a seal member, the seal member closing the port outlet in the closed position of the valve assembly, wherein the water flows through the port outlet at the second port side when the valve assembly is in the open position, and air is permitted to flow through the drainage port from the port outlet towards the port inlet at the first port side when the valve assembly is in the open position.

2. The water drain valve system of claim 1, wherein the collection vessel includes a vertical axis, and a horizontal direction is perpendicular to the vertical axis, the drainage port axis extending relative to the horizontal direction at an angle, the angle ranging from 0 degrees to 70 degrees.

3. The water drain valve system of claim 1, wherein the drainage port is substantially horizontal.

4. The water drain valve system of claim 1, further comprising a continuous rib formed around a perimeter of the port outlet, the continuous rib having a rib surface sealing against the seal member in the closed position of the valve assembly.

5. The water drain valve system of claim 1, wherein the port outlet is obround in shape.

6. The water drain valve system of claim 1, wherein the drainage port is non-cylindrical in shape.

7. The water drain valve system of claim 6, wherein the port outlet includes a port outlet height and a port outlet width, with a height-to-width ratio of the port outlet greater than 1.

8. A water drain valve system structured to drain water from a fuel-water separator, the system comprising:

a collection vessel structured to temporarily store water;

a liquid level sensor structured to monitor a level of the temporarily stored water;

a drainage port extending radially from the collection vessel along a drainage port axis and having a port inlet and a port outlet, the drainage port axis extending from the port inlet to the port outlet, the port inlet receiving water to be drained from the collection vessel, the water flowing through the drainage port and exiting through the port outlet;

a valve assembly movable between a closed position and an open position and structured to open the port outlet in the open position and close the port outlet in the closed position to selectively allow water to be drained from the collection vessel, the valve assembly comprising a solenoid coupled to a seal member, the seal member closing the port outlet in the closed position of the valve assembly; and a valve portion housing at least a portion of the valve assembly and an air vent formed in the valve portion downstream the port outlet.

9. A water drain valve system comprising:

a collection vessel defining a vertical housing axis and having a housing wall, the housing wall defining an inner cavity, the collection vessel structured to selectively store a liquid at the inner cavity;

a drainage port extending radially outward from the vertical housing axis along a drainage port axis and through the housing wall, the drainage port structured to receive the liquid from the collection vessel at a port inlet and drain the liquid at a port outlet, wherein the drainage port axis extends from the port inlet to the port outlet, the port outlet having a first port side having a first port width and a second port side spaced from the first port side by a port height, the second port side having a second port width greater than the first port width; and a valve assembly including:
a solenoid structured to operate the valve assembly between a closed position and an open position; and
a seal member structured to close the port outlet in the closed position such that the liquid is not permitted to flow through the port outlet and open the port outlet in the open position such that the liquid is permitted to drain through the drainage port, wherein the water flows through the port outlet at the second port side when the valve assembly is in the open position, and air is permitted to flow through the drainage port from the port outlet towards the port inlet at the first port side when the valve assembly is in the open position.

10. The water drain valve system of claim 9, wherein the drainage port is structured to allow a counter-flow of the air and the liquid such that the liquid flows out of the collection vessel through the drainage port and the air flows into the collection vessel through the drainage port.

11. The water drain valve system of claim 9, further comprising a continuous rib formed around a perimeter of the port outlet, the continuous rib having a rib surface sealing against the seal member when the valve assembly is in the closed position.

12. The water drain valve system of claim 9, wherein a ratio between the port height and the second port width is greater than one.

13. The water drain valve system of claim 12, wherein the port outlet has a substantially obround shape.

14. The water drain valve system of claim 12, wherein the port outlet has a substantially tapered shape.

15. The water drain valve system of claim 12, wherein a horizontal direction is perpendicular to the vertical housing axis and the drainage port axis extends relative to the horizontal direction at an angle ranging from 0 degrees to 70 degrees.

16. A water drain valve system for a fuel-water separator, the system comprising:

a collection vessel structured to receive a liquid from the fuel-water separator and temporarily store the liquid therein, the collection vessel including a housing wall having a main portion and a valve portion that extends from the main portion to a valve portion face;

a drainage port positioned through the housing wall of the collection vessel, extending radially along a drainage port axis, and structured to drain the liquid from the collection vessel, the drainage port having a port inlet structured to receive the liquid from the collection vessel and a port outlet structured to drain the liquid from the drainage port, wherein the drainage port axis extends from the port inlet to the port outlet, the port outlet having a first port side having a first port width and a second port side spaced from the first port side by a port height, the second port side having a second port width greater than the first port width;

a valve assembly positioned at least partially within the valve portion and having a solenoid housing coupled to the valve portion face, a solenoid positioned at least partially within the solenoid housing and structured to operate the valve assembly between an open position and a closed position, and a seal member coupled to the solenoid and structured to close the drainage port when the valve assembly is in the closed position and open the drainage port when the valve assembly is in the open position, wherein the water flows through the port outlet at the second port side when the valve assembly is in the open position, and air is permitted to flow through the drainage port from the port outlet towards the port inlet at the first port side when the valve assembly is in the open position.

17. The water drain valve system of claim 16, further comprising a rib extending from the valve portion face and about a perimeter of the port outlet, the rib structured to sealingly engage with the seal member when the valve assembly is in the closed position.

18. The water drain valve system of claim 16, further comprising a sensor compartment disposed within an inner cavity of the collection vessel and structured to house a sensor, the sensor structured to monitor a liquid level within the inner cavity and selectively activate the solenoid based on the liquid level.

19. A water drain valve system for a fuel-water separator, the system comprising:

a collection vessel structured to receive a liquid from the fuel-water separator and temporarily store the liquid therein, the collection vessel including a housing wall having a main portion and a valve portion that extends from the main portion to a valve portion face;

a drainage port positioned through the housing wall of the collection vessel, extending radially along a drainage port axis, and structured to drain the liquid from the collection vessel, the drainage port having a port inlet structured to receive the liquid from the collection vessel and a port outlet structured to drain the liquid from the drainage port, wherein the drainage port axis extends from the port inlet to the port outlet;

a valve assembly positioned at least partially within the valve portion and having a solenoid housing coupled to the valve portion face, a solenoid positioned at least partially within the solenoid housing and structured to operate the valve assembly between an open position and a closed position, and a seal member coupled to the solenoid and structured to close the drainage port when the valve assembly is in the closed position and open the drainage port when the valve assembly is in the open position;

an air vent formed at the valve portion and downstream the port outlet; and a spout passage disposed opposite the air vent and structured to receive the liquid from the drainage port when the valve assembly is in the open position.

* * * * *